3,367,739
PREPARATION OF ANHYDROUS SODIUM METASILICATE
Robert J. Shoaff, Midland, Mich., assignor to The Dow Chemical Company, Midland, Mich., a corporation of Delaware
No Drawing. Filed Oct. 1, 1964, Ser. No. 400,945
6 Claims. (Cl. 23—110)

This invention relates to a method of preparing sodium metasilicate and, more particularly is concerned with a process for preparing substantially pure anhydrous sodium metasilicate from aqueous mixtures containing a silica-value source.

Substantially pure anhydrous sodium metasilicate as provided by the present novel process finds particular utility as a saponifying agent, in the manufacture of foundry core molds and in the manufacture of glues.

The terms "silica-value source," "silica values" or "silica value" as used herein mean a metasilicate, metasilicate former or metasilicate donor and includes, but is not limited to, silica itself, solutions of sodium silicate and sodium metasilicate pentahydrate.

Heretofore anhydrous sodium metasilicate has been prepared by reacting molten soda ash ($Na_2CO_3$) with silica ($SiO_2$) at temperatures of from about 1300° C. to about 1500° C. The sodium metasilicate produced by this method inherently contains impurities such as soda ash, sodium sulfate, sodium chloride said impurities being present in an aggregate total of about 4 to 5 percent by weight. The recovery of a substantially pure, anhydrous sodium metasilicate product is still an existing problem without adequate resolution. It is to the solution of this problem that the instant invention is directed.

Thus, it is a principal object of the instant invention to provide a method for preparing substantially pure, anhydrous sodium metasilicate substantially free of sodium chloride and other alkali metal salts.

It is an additional object to provide a method for preparing sodium metasilicate in the anhydrous form directly from aqueous solution thereby eliminating the necessity of an expensive dehydration step needed to drive off water of hydration.

Other objects and advantages of the instant invention will become apparent from reading the detailed description thereof set forth hereinafter.

In general, the present invention is a method for preparing a substantially pure, anhydrous sodium metasilicate substantially free of sodium chloride from solutions containing silica-values. The instant method comprises providing an aqueous mixture containing at least one silica-value source and sodium hydroxide, wherein the mixture contains from about 0.25 to about 20 percent by weight silica-values and a corresponding predetermined quantity of sodium hydroxide such that the weight ratio of sodium hydroxide to silica-values, in said mixture, expressed as $Na_2O/SiO_2$, is within the range of from about 1 to about 10. Substantially anhydrous ammonia, either liquid or gaseous, is mixed with the aqueous mixture in an amount so that the final ammoniated reaction mass contains from about 16 to about 22 percent by weight $NH_3$. The ammoniated reaction mixture is maintained at a temperature within the range of from about 140° to about 250° C. for a period of from about 10 minutes to about 8 hours during which reaction period substantially anhydrous sodium metasilicate precipitates directly therein. The product is separated from the residual mixture as, for example, by filtration, centrifugation or other liquid-solid separatory procedures. It can then be washed, and dried if desired, and prepared as substantially pure, anhydrous sodium metasilicate.

In carrying out a preferred variation of the instant method the silica values supplied as an aqueous mixture containing from about 4 to about 6 weight percent silica ($SiO_2$), a sodium metasilicate solution containing from about 10 to about 14 weight percent $Na_2SiO_3$, or a sodium metasilicate pentahydrate solution containing from about 16 to 20 weight percent $Na_2SiO_3.5H_2O$, are placed in a pressurable reactor vessel, such as a stirred autoclave. Sodium hydroxide, in an amount of about 10 percent in excess of that needed to react with silica values present to prepare sodium metasilicate, is added to the mixture. The preferable weight ratio of sodium hydroxide to silica present in the reaction mixture expresses as $Na_2O/SiO_2$ is dependent on the silica source used. Thus, where silica itself is the silica source $Na_2O/SiO_2$ should be within a range of from about 1.025 to about 1.05. Where sodium metasilicate or sodium metasilicate pentahydrate is the silicate source, $Na_2/SiO_2$ should be within the range of from about 1.5 to about 3.0. Anhydrous ammonia is slowly introduced into the autoclave in an amount of from about 16 to about 18 percent by weight ammonia of the final solution. The autoclave is then heated to about 200° to about 210° C. for about 15 to 20 minutes. During the reaction period a pressure of from about 900–1000 p.s.i.g. is allowed to build up in said autoclave. As the reaction proceeds over this period, a precipitate forms in the aqueous reaction mixture which is separated therefrom, washed, and then dried. The resulting dry product is substantially pure anhydrous sodium metasilicate.

The silica-value source materials for use in the instant method can be obtained from various sources. For example, silica in a relatively pure state can be obtained from sands. Sodium metasilicate pentahydrate can be obtained in a method disclosed and described in copending U.S. patent application Ser. No. 435,391, filed Oct. 1, 1964. Solutions of sodium metasilicate can be obtained by reacting aqueous solutions of sodium hydroxide and silica under temperatures of from about 140° to about 300° C. and pressures of from about 30 to about 500 p.s.i.g.

Commercially available caustic solution obtained from the electrolysis of brines conveniently serve as a ready source of NaOH. However, these brines ordinarily contain large amounts of sodium chloride, sodium sulfate and other salts some of which are present in the solid sodium hydroxide reactants. These are not detrimental in the present process. In fact, unexpectedly, it has been found that in the present process that the presence of sodium chloride in the reaction mixture in amounts of from about 0.1 percent by weight up to its saturation point in the reaction mixture is not detrimental to the recovery of a substantially pure product but in fact, aids in the formation of the solid sodium metasilicate product in the reaction mixture. If any of these impurities are found to be present in the precipitated sodium metasilicate product, they easily are removed therefrom by first washing said product with ammonia solution and then with methanol.

The following examples are merely illustrative of the instant invention and in no way are meant to limit it thereto.

*Example I*

About 615 grams of chlorine cell effluent sodium hydroxide containing

| | Percent by weight (about) |
|---|---|
| NaOH | 8.5 |
| NaCl | 16.9 |
| $Na_2SO_4$ | 0.2 |
| $H_2O$ | 74.4 | along with about 35.3 grams of $SiO_2$ were introduced into an autoclave equipped with a rotary blade stirrer. About 135 grams of anhydrous ammonia were next introduced into the autoclave and mixed with the silica-hydroxide solution. The temperature of the so-treated solution was heated to and maintained at about 210° C. for about 15 minutes under a pressure of about 1000 p.s.i.g. The contents of the autoclave were then cooled to about 15° C. and filtered. A precipitate was recovered which was washed with equal cake volumes of 28 percent aqueous ammonia and methanol and then dried in an oven at 110° C. for about 120 minutes.

The dry cake weighed about 65.5 grams and when analyzed, found to contain the following:

| | Percent by weight (about) |
|---|---|
| Anhydrous $Na_2SiO_3$ | 97.6 |
| NaCl | .1 |
| $SiO_2$ | 2.3 |

Thus, it is seen that about 95.75 percent of the silica values orignally introduced into the autoclave was recovered as substantially pure anhydrous sodium metasilicate. If desired the product can be purified still further by washing it with aqueous ammonia and methanol to remove the impurities, primarily sodium chloride, therefrom.

*Example II*

To about 407 grams of sodium metasilicate solution containing about 12.2 percent by weight $Na_2SiO_3$ was added about 102 grams of a caustic solution containing about 50 percent by weight NaOH. The solution was heated to about 210° C. Anhydrous ammonia was then slowly introduced into the solution until the ammoniated solution contained 130 grams of $NH_3$. The contents of the solution was cooled to about 15° C. and filtered. A precipitate was recovered which was washed with equal cake volumes of 28 percent aqueous ammonia and methanol and dried in an oven at 110° C. for about 2 hours.

The dried cake weighed about 45 grams and, when analyzed, found to contain the following:

| | Percent by weight (about) |
|---|---|
| $Na_2SiO_3$ | 99.99 |
| NaCl | .01 |

Thus, it is seen that about 92 percent of the silica values originally introduced into the autoclave was recovered as substantially pure anhydrous sodium metasilicate.

Various modifications can be made in the method of the instant invention without departing from the spirit or scope thereof for it is to be understood that I limit myself only as defined in the appended claims.

What is claimed is:

1. A method of preparing anhydrous sodium metasilicate from aqueous silica-value source containing mixtures which comprises:
   (a) providing an aqueous mixture containing at least one silica value source and sodium hydroxide wherein the mixture contains from about 0.25 to about 20 percent by weight silica values and a corresponding predetermined quantity of sodium hydroxide such that the weight ratio of sodium hydroxide to silica values in said mixture, expresses as $Na_2O/SiO_2$, is within the range of from about 1 to about 10;
   (b) mixing anhydrous ammonia with said aqueous mixture, said ammonia being present in an amount of from about 16 to about 22 percent by weight of the final ammoniated reaction mixture while maintaining the temperature of said reaction mixture under pressure and within the range of from about 140° to about 250° C. for a period of from about 10 minutes to about 8 hours thereby precipitating out anhydrous sodium metasilicate; and
   (c) separating and recovering the anhydrous sodium metasilicate from the residual mixture.

2. The method in accordance with claim 1 wherein the ammoniated reaction mixture is maintained at a temperature of about 210° C. for about 15 minutes.

3. The method in accordance with claim 1 wherein the sodium hydroxide reactants used therein contains sodium chloride in an amount of from 0.1 percent by weight up to that quantity needed to saturate the reaction mixture.

4. A method of preparing anhydrous sodium metasilicate from aqueous silica value containing mixtures which comprises:
   (a) providing an aqueous mixture containing silica (SiO) in an amount of from about 4 to about 6 percent by weight and a corresponding predetermined quantity of sodium hydroxide such that the weight ratio of sodium hydroxide to silica in said mixture, expressed as $Na_2O/SiO_2$, is within the range of from about 1.025 to about 1.05;
   (b) mixing anhydrous ammonia with said aqueous mixture, said ammonia being present in an amount of from about 16 to about 18 percent by weight of the final ammoniated aqueous reaction mixture while maintaining the temperature of said reaction mixture within the range of from about 200° to about 210° C. for a period of from about 15 to about 20 minutes, thereby precipitating out anhydrous sodium metasilicate; and
   (c) separating and recovering the anhydrous sodium metasilicate from the residual mixture.

5. A method of preparing anhydrous sodium metasilicate from aqueous silica value containing solutions which comprises:
   (a) providing an aqueous solution containing sodium metasilicate ($Na_2SiO_3$) in an amount of from about 10 to about 14 percent by weight and a corresponding predetermined quantity of sodium hydroxide such that the weight ratio of sodium hydroxide to silica in said solution, expressed as $Na_2O/SiO_2$, is within the range of from about 1.5 to about 3;
   (b) mixing anhydrous ammonia with said aqueous solution, said ammonia being present in an amount from about 16 to about 18 percent by weight of the final ammoniated aqueous solution while maintaining the temperature of said solution under pressure and within the range of from about 200° to about 210° C. for a period of from about 15 to about 20 minutes, thereby precipitating out anhydrous sodium metasilicate; and
   (c) separating and recovering the anhydrous sodium metasilicate from said solution.

6. A method of preparing anhydrous sodium metasilicate from aqueous silica value containing solutions which comprises:
   (a) providing an aqueous solution containing sodium metasilicate pentahydrate ($Na_2SiO_3.5H_2O$) in an amount of from about 16 to about 20 percent by weight and a corresponding predetermined quantity of sodium hydroxide such that the weight ratio of sodium hydroxide to silica in said solution, expressed as $Na_2O/SiO_2$, is within the range of from about 1.5 to about 3;
   (b) mixing anhydrous ammonia with said aqueous solution, said ammonia being present in an amount of from about 16 to about 18 percent by weight of the final ammoniated aqueous solution while maintaining the temperature of said solution under pressure and within the range of from about 200° to about 210° C. for a period of from about 15 to about 20 minutes, thereby precipitating out anhydrous sodium metasilicate; and (c) separating and recovering the anhydrous sodium metasilicate from said solution.

References Cited

UNITED STATES PATENTS

| | | | |
|---|---|---|---|
| 2,285,299 | 6/1942 | Muskat et al. | 23—184 |
| 2,830,876 | 4/1958 | Mockrin et al. | 23—110 |

OSCAR R. VERTIZ, *Primary Examiner.*

A. GRIEF, *Assistant Examiner.*